United States Patent
Schwarzbich

(10) Patent No.: US 6,230,867 B1
(45) Date of Patent: May 15, 2001

(54) SEAT ADJUSTER FOR VEHICLE

(76) Inventor: Jörg Schwarzbich, Wertherstr. 15, D-33615, Bielefeld (DE)

( * ) Notice: Subject to any disclaimer, the term of this patent is extended or adjusted under 35 U.S.C. 154(b) by 0 days.

(21) Appl. No.: 09/402,790

(22) PCT Filed: Feb. 9, 1999

(86) PCT No.: PCT/EP99/00833

§ 371 Date: Dec. 20, 1999

§ 102(e) Date: Dec. 20, 1999

(87) PCT Pub. No.: WO99/41101

PCT Pub. Date: Aug. 19, 1999

(30) Foreign Application Priority Data

Feb. 10, 1998 (DE) .............................. 298 02 055

(51) Int. Cl.[7] .................. B60N 2/16; B60N 2/22
(52) U.S. Cl. ................. 192/223.2; 192/15; 192/19
(58) Field of Search .................. 192/223.2, 15, 192/17 R, 19, 223.1; 297/361.1, 362, 374

(56) References Cited

U.S. PATENT DOCUMENTS

| 2,583,428 | * | 1/1952 | Houplain | 192/223.2 |
| 4,339,103 | | 7/1982 | Mori et al. | |
| 5,248,017 | * | 9/1993 | Schwarzbich | 192/223.2 |
| 5,593,210 | * | 1/1997 | Schwarzbich | 297/361.1 |
| 5,794,479 | | 8/1998 | Schwarzbich | |
| 5,865,285 | * | 2/1999 | Minkenberg et al. | 192/15 |
| 5,881,854 | | 3/1999 | Rougnon-Glasson | |
| 5,896,973 | * | 4/1999 | Hochmuth et al. | 192/223.2 |

FOREIGN PATENT DOCUMENTS

| 36 08 858 | 10/1987 | (DE) . |
| 38 15 602 | 11/1989 | (DE) . |
| 36 16 832 | 10/1992 | (DE) . |
| 196 33 011 | 2/1998 | (DE) . |
| 2 168 421 | 6/1986 | (GB) . |

* cited by examiner

*Primary Examiner*—Rodney H. Bonck
(74) *Attorney, Agent, or Firm*—Burns, Doane, Swecker & Mathis, LLP

(57) ABSTRACT

A vehicle seat has a seat adjuster. The seat adjuster includes a brake acting between a stationary part and an adjustable part. By use of the brake, the adjustable part can be blocked in a variety of positions in both adjustment directions on the stationary part and which can be applied by means of a freely switching element. An adjusting device acts on the freely switching element for selectively adjusting the adjustable part in both directions. An additional locking mechanism is provided which when the adjusting device is not in operation, automatically engages and when the adjusting device is not in operation automatically disengages.

10 Claims, 5 Drawing Sheets

SEAT ADJUSTER FOR VEHICLE

BACKGROUND OF THE INVENTION

The invention relates to a seat adjuster, for example, for adjusting the height of a seat or the tilting of the backrest of the seat in a motor vehicle.

Known are seat adjusters with a locking mechanism through which the adjustable part of the seat can be tightly locked onto a stationary part. If the user desires to adjust the seating position, the locking mechanism has to, first, be unlocked before the adjustable part of the seat can be adjusted either through direct bodily influence on the adjustable part or, however, with the aid of an adjusting device such as a hand wheel or lever or the like. When the desired new position is reached, the locking mechanism is allowed to reengage in this position.

Seat adjusters of this type, however, have the disadvantage that only a stepwise adjustment, according to measure of the discrete engagement positions of the locking mechanism, is possible. Besides this, convenience of operation is impaired because the locking mechanism is difficult to release especially while under a load and can easily get stuck or jammed during re-engagement in the new position and/or abruptly falls into the engagement position accompanied by an unpleasant noise. Further, such a locking mechanism is difficult to combine with a drive which increases the operational force exerted by hand onto the adjusting device.

On the other hand, known are seat adjusters which, instead of a locking mechanism, have brake acting between the adjustable part and the stationary part with which the adjustable part can be steplessly blocked at selected positions in both directions. To release the brake, a releasing device which is coupled to the adjusting device is provided such that the brake is released automatically when the adjusting device is operated and the force is transferred from the adjusting device to the adjustable part, while, if the adjusting device is not operated and there is a flow of force in the opposite direction, the brake is automatically blocked.

Seat adjusters of this type make possible a stepless adjustment of the seat and are excellent in operational convenience since the release of the brake during operation of the adjusting device as well as the gripping of the brake after reaching the desired position of engagement occur automatically and in a manner hardly noticeable by the user.

In seat adjusters of this latter type, a load acting in the same direction over a longer period of time can lead to a crawling of the brake and thus to a gradual, undesirable adjustment of the seat, especially when, in addition to the continuously acting force, there is a vibration such as is regularly the case in motor vehicles during driving. For example, in seat height adjusters, there is often a strong spring which places an upward pressure on the seat and thus partially balances out the body weight of the user, such that the force required for an adjustment process is reduced. If the seat is occupied, the downwardly acting force of the weight outweigh, such that the seat gradually slopes downward due to the crawling effect of the brake. If the seat has no load, however, the upwardly directed force of the spring outweighs, such that the seat moves gradually upward. In both cases, from time to time, a readjustment of the seating position is needed.

It is an object of the invention to provide a stepless seat adjuster in which the seat remains reliably in the set position even under a load.

SUMMARY OF THE INVENTION

This problem is solved in a seat adjuster according to the invention by means of an additional locking mechanism which automatically engages when the adjusting device is not in operation and disengages when the adjusting device is in operation.

Since the seat is kept in the set position primarily through the braking force of the brake, the additional locking mechanism has to absorb only apart of the acting forces. It can therefore be very small, easy to operate and for short lifting motion such that the engagement and disengagement of the additional locking mechanism is hardly noticeable for the user and thus does not impair convenience of use. Nevertheless, the crawling effect of the brake under a load can be effectively subdued, so that the seat remains reliably in the set position.

In seats of motor vehicles, in which the belt lock for the safety belt is mounted directly at the seat, the additional locking mechanism according to the invention contributes additionally to the increase in accident safety. Thus, in such a seat, the seat height adjuster must be capable, at impact, of absorbing the forces of inertia transferred through the safety belt, so that the seat does not give in. One part of these forces is absorbed, according to the invention, by the additional locking mechanism, so that the brake is less burdened by the load at impact.

The adjustable part can refer to the seat in its entirety or to a part of the seat, for example, the backrest; it can, however, also refer to a gear element of a gear reduction mechanism via which the adjusting device effects the seat adjustment.

Advantageous embodiments of the invention result from the sub-claims.

The additional locking mechanism can be in effect between the stationary part and the adjustable part. In this case, provided are a multitude of notches, either on the stationary part or on the adjustable part, into which a suitable locking mechanism grips as is generally the case in mechanical locking arrangements such as arm locks, ratchet couplings or the like. Since the additional locking mechanism needs to have only a relatively small holding power, the notches can be formed at very small intervals, so that a very large number of notched positions can be realized. After an adjustment process, the adjustable part is held in position, at first, merely through the brake, and it is not necessary that the additional locking mechanism engages immediately after that. Only when the adjustable part changes its position somewhat based on the crawling effect of the brake does the additional locking mechanism engage very slowly and in a manner hardly noticeable by the user; and the adjustable part is finally locked in the position reached.

Seat adjusters without gear mechanisms often have, as an adjusting device, a lever with a telescope-like extendable handle. Prior to the operation of the adjusting device, the handle is extended to elongate the lever arm. In this case, for the release of the additional locking mechanism, also the relative movement between the extendable handle and the rest of the part of the lever can be used.

The brake of the seat adjuster can also, for example, be a coiled spring brake or a freewheeling brake. In these cases, the releasing device serves, at the same time, as a drive element with which the operational force of t4e adjusting device is transferred to the adjustable part. Since, in such brakes, the releasing element is mechanical coupled to the adjustable part, a crawling or running of the brake inevitably also leads to a movement of the releasing element. In seat adjusters with such a brake it is therefore also possible to allow the additional locking mechanism to be in effect between the stationary part and the releasing element in order to eliminate the crawling of the brake.

BRIEF DESCRIPTION OF THE DRAWING

In the following, an example of a preferred embodiment of the invention is more closely described using the diagram.

DETAILED DESCRIPTION OF PREFERRED EMBODIMENTS OF THE INVENTION

Figure 1:
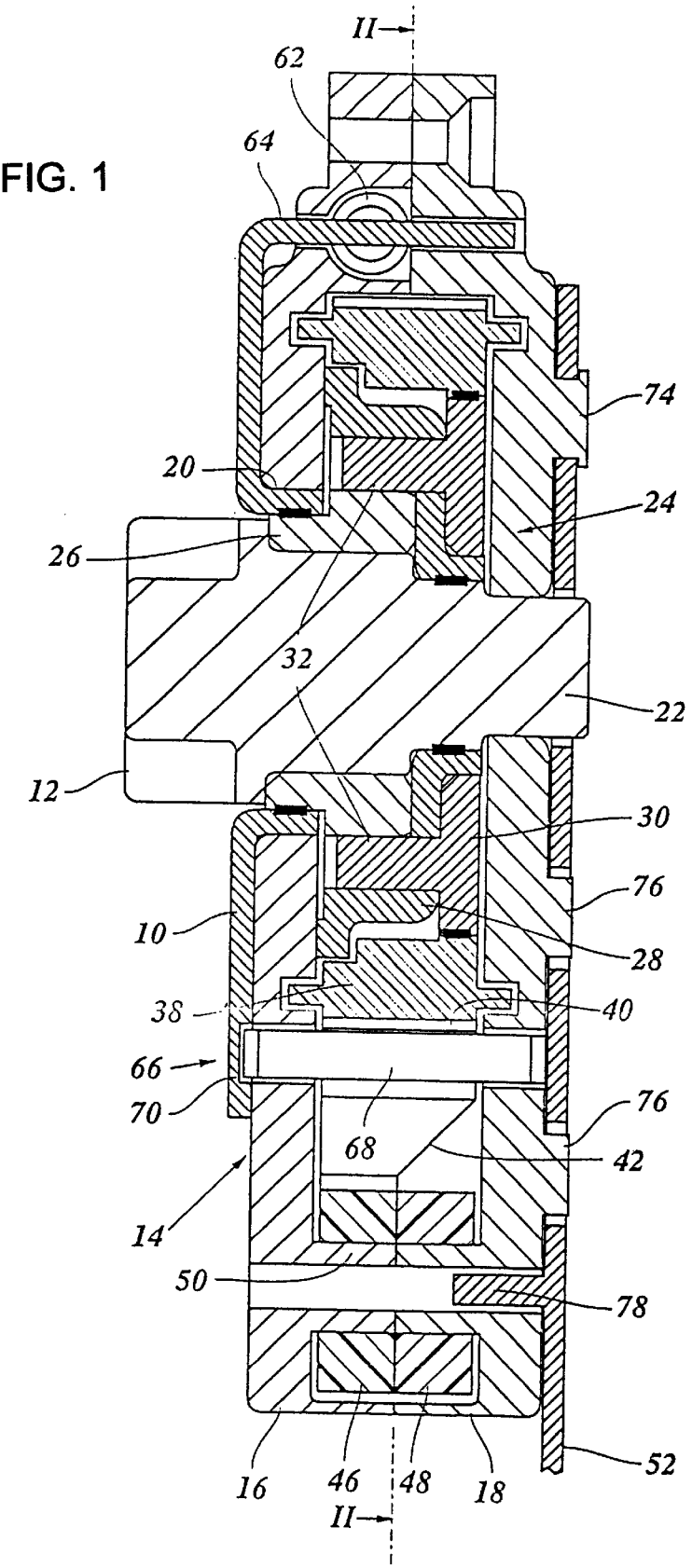
FIG. 1 shows an axial cross-section through a seat adjuster.

The seat adjuster shown in FIG. 1 serves, for example, to adjust the height of a seat in a motor vehicle and has, as a stationary part, a base plate 10 which is rigidly fixed to a part of the body of the vehicle. As an adjustable part, provided is a pinion 12 which, via a not-shown gear mechanism, effects the adjustment of the height of the seat of a motor vehicle.

A housing 14 of the seat adjuster is formed from two half shells 16, 18 made of plastic and is held as turnable on hub 20 formed on a base plate 10. The pinion 12 consists of one piece at an end of an axle 22 which is stored in a housing 14 as turnable. On the axle 22, a freewheeling brake 24 is arranged which allows that the blocking of the axle 22 and thus the pinion 12 in both rotational directions with respect to the base plate 10.

The freewheeling brake 24 consists of an inner ring 26, an outer ring 28 and a releasing wheel 30. The inner ring 26 is rotatably mounted on an axle 22 and is tightly attached to the hub 20 of the base plate 10. The outer ring 2 8 is tightly attached to the axle 22 and is shaped as a pot, so that it surrounds the inner ring 26 at a radial distance. The releasing wheel 30 is arranged axially outside of the outer ring 28 and is arranged on a hoop of the outer ring 28. Multiple claws 32 are arranged at equal angle distances on the releasing wheel 30 and protrude through openings of the outer ring 28 into the intermediary space between the inner ring 26 and the outer ring 28. The openings (without reference symbols) of the outer ring 28 are in peripheral direction formed as a arc, such that it recieves a respective claw 32 in peripheral direction with a certain amount of play.

Figure 2:
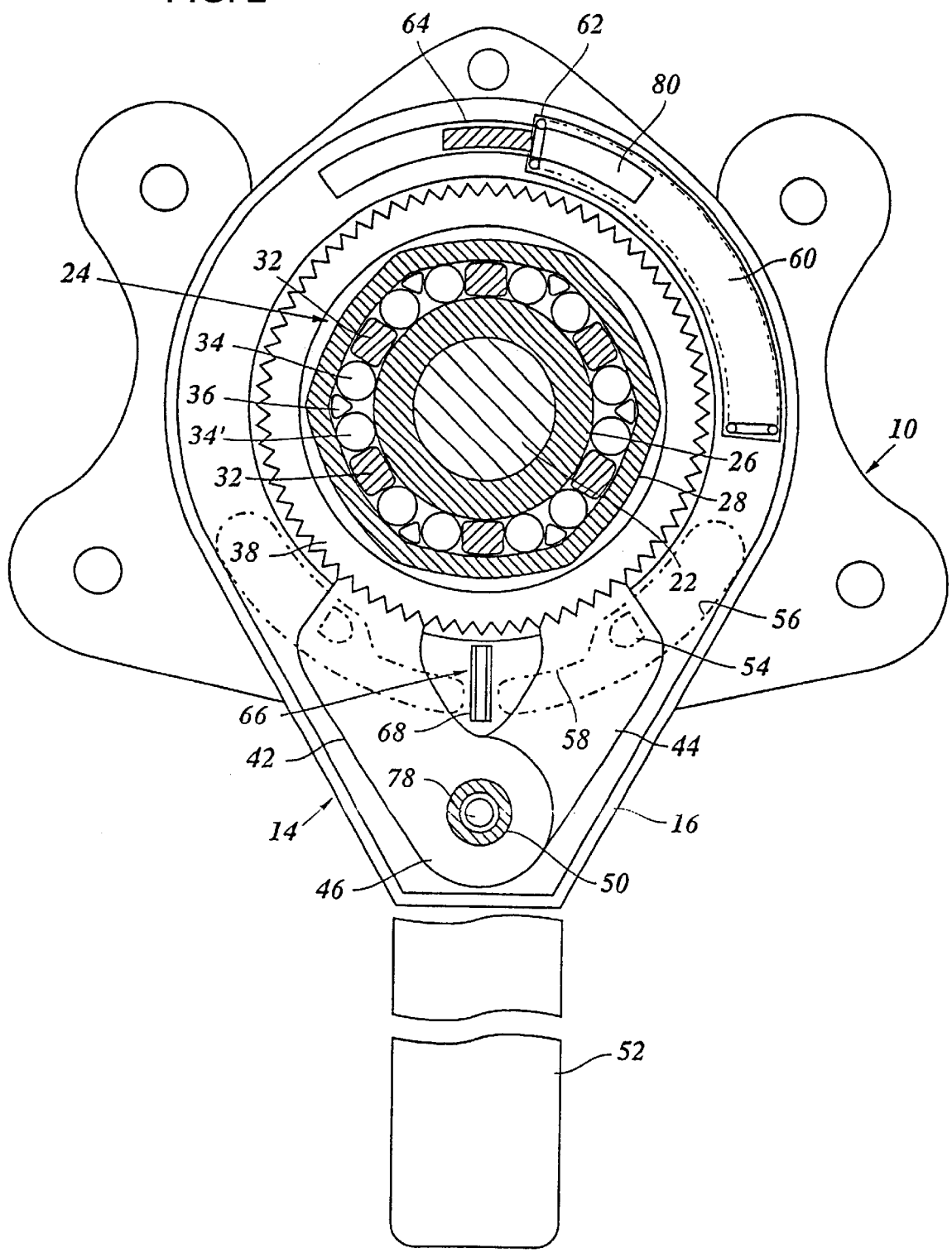
FIG. 2 shows a cross-section along the line II—II in FIG. 1.

As shown in FIG. 2, arranged in the intermediary space between the inner ring 26 and the outer ring 28 in peripheral direction between two neighboring claws 32 are two rotary bodies 34, 34' and a clamping element 36. The clamping element 36 is situated in peripheral direction between both rotary bodies 34, 34' and consists of an elastic material, for example, of a intrinsically elastic plastic, so that it presses apart the rotary bodies 34, 34' and biases them against the individual neighboring claws 32. The inner cross-section of the outer ring 28 is not exactly circular, but instead has the shape of a hexagon with strongly rounded-off corners. The positions of the clamping bodies 36 correspond to the corners of the hexagon, so that the intermediary space between the inner ring and the outer ring is constricted by the clamping bodies from both directions.

If, over the pinion 12 and the axle 22, a moment of torque acts on the outer ring 28, for example, in clockwise direction in FIG. 2, then the rotary bodies 34, 34' roll off at the inner surface of the outer ring 28 and at the outer surface of the stationary inner ring 26. Thus, upon turning the outer ring 28, the rotary body 34' remains somewhat behind the outer ring 28, so that, due to the narrowing of the intermediary space, it gets stuck and blocks. In this manner, the outer ring 28 and thus also the axle 22 and the pinion 12 are self-inhibitingly blocked at the inner ring 26 which, in turn, is held tightly against the base plate 10. If the moment of torque acts in counter-clockwise direction in FIG. 2 on the outer ring 28, then the rotary bodies 34 have the same function as previously the rotary bodies 34'. The adjustable part (pinion 12) is thus blocked in both directions at a stationary part (base plate 10).

If, in contrast, a moment of torque acts on the releasing wheel 30, for example, in clockwise direction in FIG. 2, then initially the claws 32 press against the rotary bodies 34', since, as mentioned, the claws 32 have some play in the openings of the outer ring 28. In this way, it is prevented that the rotary bodies 34' block in the intermediary space between the inner ring and the outer ring, and therefore the outer ring 28 can be taken along in the clockwise direction by means of the claws 32 of the releasing wheel, while the rotary bodies 34 and 34' roll off between the outer surface of the inner ring 26 and the inner surface of the outer ring 28. This applies equally to a moment of torque acting in opposite direction. The turning of the outer ring 28 is transferred via the axle 22 to the pinion 12. In such a way, with the aid of the releasing wheel 30, the pinion 12 can be driven into any desired adjustment direction. As soon as the moment of torque acting on the releasing wheel 30 is released, the pinion 12 is again blocked by the freewheeling brake 24 in the position reached.

The freewheeling brake 24 is surrounded by a gear arranged rotationally in the housing 14, which as shown in FIG. 1 is attached tightly to the outer circumference of the releasing wheel 30. A gear ring 40 at the outer circumference of the gear 38 are engaged tooth in tooth with two arms 42, 44 which are individually held with a hub section 46, 48 as tilting on a common housing-tight axis 50. The arms 42, 44 arranged in a mirror-imaged manner with respect to the plane of the diagram in FIG. 1, so that in FIG. 1 only the hub section 48 of the knob 44 can be seen.

At the outer shell 18 of the housing 14, a lever 52 serving as an adjusting device is connected.

As indicated with a dotted line in FIG. 2, the arms 42, 44 have each, in the area of the free end, a cam 54 which through the opening of the half shell 16 of the housing grips into an arc-shaped guide contour 56 of the base plate 10.

The arms 42, 44 are held in a tight grip with the gear 38 by means of a not-shown spring. When the lever 52 is tilted in clockwise direction in FIG. 2, the housing 14 and the arms 42, 44 are tilted about the axis (middle axis of the axle 22) defined by the hub 20 of the base plate. The moment of torque is, in this case, is transferred via the arm 42 preceding in the direction of rotation to the gear 38 and further to the releasing wheel 30, so that the freewheeling brake 24 is released and the axle 22 and the pinion 12 are turned. The cam 54 of the arm 44 runs on up to the leading contour 58 of the leading stage 56. In this manner, the arm 44 is tilted away from gear 38, so that the tooth gripping is lifted. If then the lever 52 is tilted back into the starting position in counter-clockwise direction, only the arm 42 which drags in this rotational direction is still in a grip with the gear 38. Based on the climbing of the toothed sides, the arm 42 can, however, be easily released from the grip with the gear 38.

The gripping force is thus not sufficient to turn the gear 38 and the releasing wheel 30. Therefore, the axle 22 and the pinion 12 are blocked by the freewheeling brake 24 in the position reached, and the lever 52 and the housing 14 move alone back into the starting position, while the arm 42 glides over the gear ring of the gear 38 like a ratchet. Through multiple repetitions of the abovedescribed process, the axle 22 and the pinion 12 can be stepwise adjusted in clockwise direction in FIG. 2. Correspondingly, a stepwise adjustment in opposite direction is possible by tilting the lever 52 out of the starting position shown in FIG. 2 in the counter-clockwise direction.

Each of the two half shells 16, 18 of the housing 14 forms an arc-shaped canal 60 outside of the gear 38 which canal accepts a coil spring. The coil springs 62 support themselves individually with one end on the corresponding half shell of the housing and with the other end on a stopping device angled away from the base plate 10. If the housing 14, together with the lever 52, is tilted in the one or the other direction out of the starting position shown in FIG. 2, one of the two coil springs 62 is compressed and thus a restoring force is generated which bring the housing and the lever 52 back again into the starting position.

If an equi-directional moment of torque acts on the pinion 12 and the axle 22 over a longer period of time, for example, due to the own weight of the vehicle seat and the weight of the user occupying it, this can lead to a gradual crawling of the freewheeling brake 24, especially with additional shaking. In other words, the rotary bodies 34, 34' eventually roll off the inner ring 26, so that the outer ring 28 gives in to the permanently acting moment of torque and eventually turns relative to the inner ring. Since the outer ring 28 is rigidly connected to the gear 38, which, in turn, is in a grip with both of the arms 42, 44, the moment of torque is transferred via the arms 42, 44 and the axis 50 to the housing 14 and the lever 52, so that the housing and the lever 52 also turn in the corresponding direction. This undesired automatic adjustment of the seat adjuster is prevented by means of an additional locking mechanism 66.

This additional locking mechanism 66 is formed in the example shown using a latch 68 which is arranged in the intermediary space between both of the arms 42, 44 and extends across through the housing 14 from the lever 52 to the base plate 10 located at the opposite side of the housing. The latch 68 is tapered off roof-like and grips, depending on the operational position, either with a groove of the lever 52 or a groove of the base plate 10, as shown in detail with FIGS. 3–5.

Figure 3:
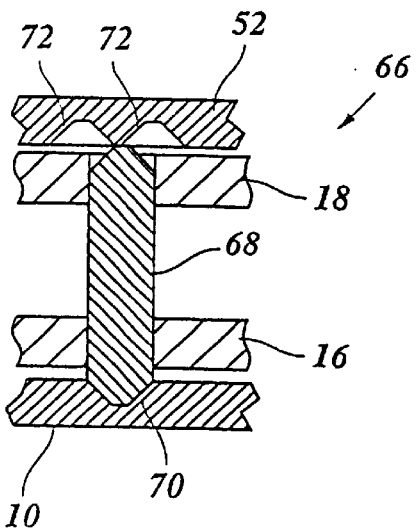
FIGS. 3–5 show an additional locking mechanism of the seat adjuster according to FIGS. 1 and 2 in different positions.

FIG. 3 shows the additional locking mechanism 66 in the normal position of the seat adjuster according to FIG. 2. In this condition, the latch 68 grips into a groove 70 of the base plate 10. The lever 52 has two grooves 72 which, in this condition, lie on both sides of the latch 68. By means of the lever 52, the latch 68 is thus forcibly held in a grip with the base plate 10. In this way, both of the half shells 16, 18 of the housing are latched tightly against the base plate 10 by means of the latch 68, so that even then the housing 14 cannot adjust itself relative to the base plate 10 when the above-described crawling effect in the freewheeling brake 24 occurs.

As can be seen in FIG. 1, the lever 52 is rotationally connected in the proximity of its one end (above in FIG. 1) by means of a joint 74 to the half shell 18 of the housing 14. The end of the axle 22 as well as two pegs 76 formed onto the half shell 18 are taken up with a certain degree of play into corresponding openings of the lever 52, and a peg 78 attached to the lever 52 grips with play onto a hole of the axis 50. Thus the lever 52 is rotational in a narrow area relative to the housing 14. If the lever 52 is tilted out of the position shown in FIG. 2, it turns thus at first alone about the joint 74 until one of the pegs 76 impacts against the inner edge of the corresponding opening of the lever 52 and/or the peg 78 impacts against the inner surface of the hole of the axis 50. Only then is the housing 14 also taken along, and the lever 52 and the housing 14 are turned as a unit about the axis of the axle 22.

Figure 4:
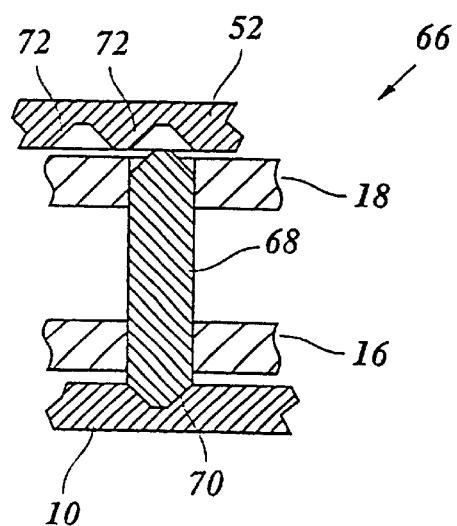
Figure 5:
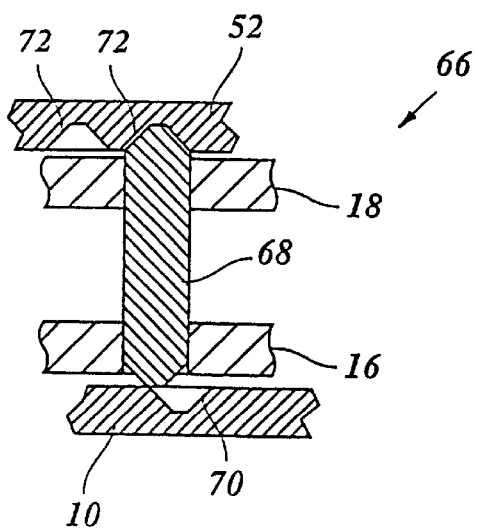

In the beginning tilting movement of the lever 52 about the joint 74, the grooves 72 move relative to the latch 68, so that, for example, the position shown in FIG. 4 is reached. If then upon further tilting of the lever 52, the half shells 16, 18 of the housing are taken along, the half shells 16, 18 of the housing and the latch 68 move together relative to the base plate 10, and the tapered surfaces of the grooves 70 and the corresponding counter-surfaces of the latch 68 push the latch 68 out of the groove 70. In so doing, the opposite end of the latch 68 enters into one of the grooves 72 of the lever 52, as is shown in FIG. 5. In this manner, the additional locking mechanism is lifted, so that the housing 14 can be turned relative to the base plate.

As can be seen in FIG. 2, the stopping device 64 grips into an arc-shaped hole 80 of the housing 14. The tilting area of the housing relative to the base plate 10 is limited in that the stopping device 64 impacts against one end of this hole 80. If, after that, the lever 52 is released, the housing 14 returns due to the restoring force of the coil spring 62 in the starting position according to FIG. 2, and the additional locking mechanism 66 assumes again the condition shown in FIG. 4.

The lever 52 is pressed relative to the half shell 18 of the housing by means of a not-shown spring into the starting position according to FIGS. 2 and 3. Through the force of this spring, the latch 68 is again pushed out of the groove 72, so that its opposite end again enters the groove 70 of the base plate 10. When the lever 52 returns again into the position shown in FIG. 3, the additional locking mechanism 66 engages thus automatically again.

The above-described embodiment example can be altered in a multi-faceted manner. For example, instead of one latch 68, there can be two separate latches which, instead of gripping into one groove of the base plate 10, act together with the outer circumference of the base plate 10 and effect the locking in one of the two adjustment directions.

In the above-described embodiment example, the latch 66 is blocked by the lever 52 in the locking position, and after the lever has been tilted, the tapered surfaces of the groove 70 and of the latch effect that the latch 68 is pushed into the unlocked position. Alternatively, however, it is also possible to form control curves on the lever 52 which act together with the latch 68 in such a way that they pull it back actively into the unlocked position when the lever is tilted.

In another variation of the embodiment according to FIGS. 1 and 2, the lever 52 is tilted relative to the housing 14 about the axis 50. The upper end of the lever 52 in FIG. 1 and the base plate 10 are elongated upwardly, and the latch is arranged at the upper end of the housing in FIG. 1. In this case, a larger adjustment path at a given tilt angle of the lever 52 relative to the housing 14 is available for the locking and unlocking of the additional locking mechanism. The elastic return of the positioning of the lever 52 into the neutral position relative to the housing 14 can be achieved, for example, through a sliding pen situated in the housing 14 and having a conical end which grips into a corresponding conical hole of the lever 52 and is elastically pressed against the lever. This arrangement of the repositioning mechanism has the advantage that the lever 52 is reliably centered in the neutral position in which it blocks the unlocking of the additional locking mechanism.

Figure 6:
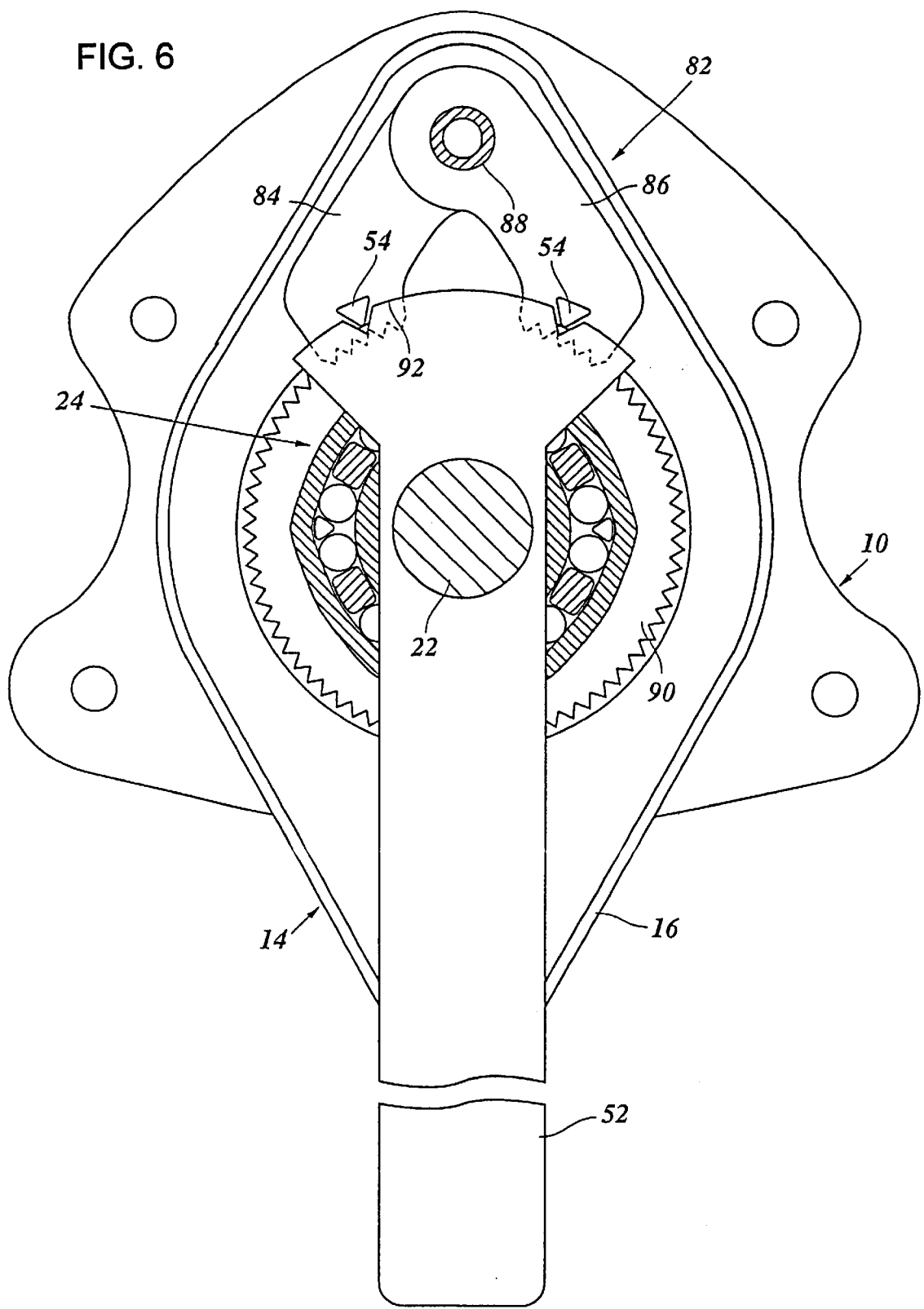
FIGS. 6 and 7 show a simplified representation analogous to FIG. 2 for respective modified embodiments of the invention.

FIG. 6 shows an embodiment example in which the additional locking mechanism 82 is formed by means of two arms 84, 88 which are formed similarly to the arms 42 and 44 and lie diametrically opposite to these. The arms 84, 86 are arranged as titled on a axle peg 88 protruding from the base plate 10 and are in a grip with a gear 90 which is arranged at the outer circumference of the outer ring 28 and lies in a plane opposite the gear 38 (FIG. 2). The lever 52 is, in this case, tilted about the axis of the axle 22 and has at its free end a symmetric leading contour 92 which acts together with the grooves of the arms 84, 86.

If the lever 52 and the housing 14 have been tilted together and then the lever 52 is released, it returns due to the effect of a not-shown elastic repositioning mechanism into its neutral position relative to the housing 14, and the arms 84, 86 engage again with the gear 90 and hold the outer ring 28 and thus the axle 22 an the pinion 12 in the then-reached position. The additional locking mechanism 82 thus does not act on the releasing wheel, but locks the adjustable part 12, 22, 28 directly to the stationary part 10. Optionally, the embodiment 6 can also be modified, such that the arms 84, 86 of the additional locking mechanism grip into the gear 38 connected to the releasing wheel 30.

Figure 7:
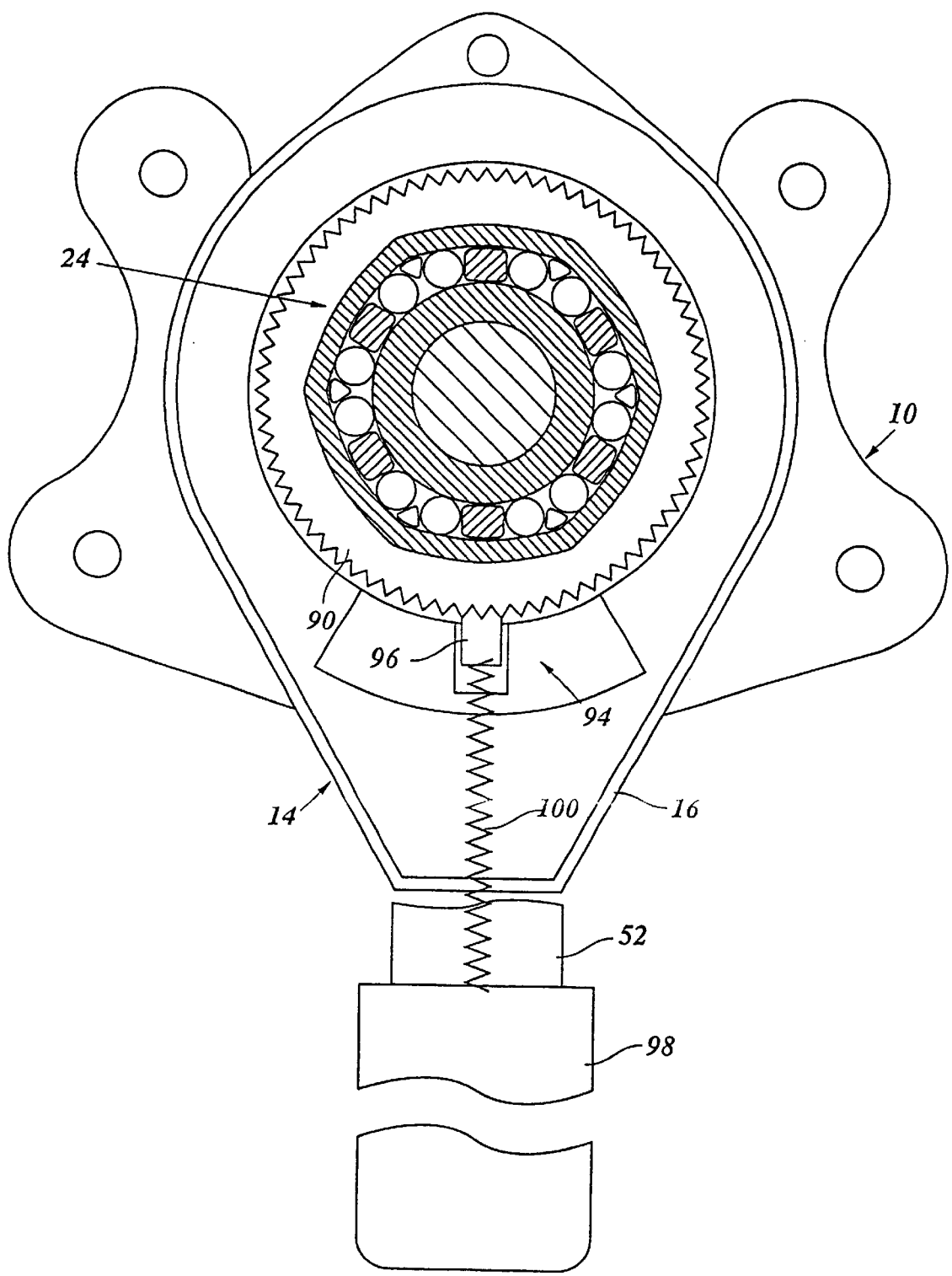

FIG. 7 shows an embodiment in which the additional locking mechanism 94 acts directly between the adjustable part and the moveable part. A arm 96 radially moving in respect to the axle 22 and lead into the base plate is elastically held in grip with the gear 90, so that it, as in FIG. 6, locks the outer ring 28 and thus the axle 22 to the base plate 10.

The lever 52 has in this embodiment a telescope-like extendible handle 98 which is coupled with the arm 96, as is indicated by Spring 100 in the diagram.

If the handle 98 is extended to elongate the lever arm for the operation of the seat height adjuster, then the handle 96 is retracted, so that the gear 90 and thus the adjustable part is freed. If, after completion of the adjustment process, the handle 98 is released, the arm 96 engages again in a gear 90 and holds the adjustable part in the position reached.

In this embodiment example, the lever 52 can also be directly connected to the releasing wheel. The lever then does not return into a certain neutral position, but instead it remains after each adjustment process in the angled position corresponding to the individual set position.

What is claimed is:

1. A seat adjuster comprising:

a stationary part;

an adjustable part movable in either of two directions relative to the stationary part;

a brake for holding the adjustable part in positions of adjustment;

an actuating mechanism for releasing the brake and adjusting the adjustable part; and a locking mechanism for locking the adjustable part against adjustment relative to the stationary part, the locking mechanism being engageable automatically when the actuating mechanism is not being actuated and being releasable by manipulation of the actuating mechanism, wherein the actuating mechanism is operable to release the locking mechanism in response to movement of at least a portion of the actuating mechanism in a direction different from a direction in which the actuating mechanism is moved to effect adjustment of the adjustable part.

2. The seat adjuster according to claim 1 wherein the actuating mechanism is operable to release the locking mechanism in response to movement of the actuating mechanism in the same direction in which the actuating mechanism is moved to effect adjustment of the adjustable part.

3. The seat adjuster according to claim 1 wherein the portion of the actuating mechanism is rotatable about an axis to effect adjustment of the adjustable part, and is movable linearly to effect release of the locking mechanism.

4. The seat adjuster according to claim 3 wherein the actuating mechanism includes a telescopic lever, the lever being extensible/retractable in a linear direction to define the linear movement for releasing the locking mechanism.

5. The seat adjuster according to claim 1 wherein the locking mechanism engages directly between the stationary part and the adjustable part when locking the adjustable part.

6. A seat adjuster comprising:

a stationary part;

an adjustable part movable in either of two directions relative to the stationary part;

a brake for holding the adjustable part in positions of adjustment;

an actuating mechanism for releasing the brake and adjusting the adjustable part; and a locking mechanism for locking the adjustable part against adjustment relative to the stationary part, the locking mechanism being engageable automatically when the actuating mechanism is not being actuated and being releasable by manipulation of the actuating mechanism, wherein the actuating mechanism includes a switching element arranged for engaging and releasing the brake, and a lever operably connected to the switching element for transmitting movement to the switching element.

7. The seat adjuster according to claim 6 wherein the locking mechanism is arranged to prevent movement of the switching element while permitting movement of the lever.

8. The seat adjuster according to claim 7 wherein the actuating mechanism includes a pair of one-way coupling interconnecting the lever and the switching element, the lever being biased to a neutral position and displaceable out of the neutral position in either of two directions, wherein one of the one-way couplings is arranged to transmit a driving force from the lever to the switching element during displacement of the lever in one direction, and the other of the oneway couplings is arranged to transmit a driving force from the handle to the switching element during displacement of the lever in the other direction.

9. The seat adjuster according to claim 8 wherein the adjustable part comprises an axle rotatably mounted in the stationary part, the actuating mechanism including a housing mounted for rotation relative to the axle about an axis of the axle; wherein the lever, the one-way couplings, the switching element, and the brake are all mounted on the housing, the housing being biased to a neutral position relative to the stationary part, the lever being rotatable for a limited extent relative to the housing about the axis of the axle, and being biased to a neutral position relative to the housing.

10. The seat adjuster according to claim 9 wherein the stationary part and the lever are spaced apart in the direction of the axis apart in the direction of the axis to be disposed on opposite sides of the housing, the locking mechanism comprising a latch slidably mounted in the housing, the latch being lockingly engageable with the stationary part and being moveable out of such locking engagement in response to displacement of the lever relative to the housing during adjustment of the adjustable part.

* * * * *